(12) United States Patent
Strömberg

(10) Patent No.: US 8,411,032 B2
(45) Date of Patent: Apr. 2, 2013

(54) LOOP MEMBER FOR POINTING DEVICES FOR COMPUTERS, CONSISTING OF WIRES LINKED TO EACH OTHER AS WELL AS POINTING DEVICE COMPRISING SUCH A LOOP MEMBER

(76) Inventor: Rolf Strömberg, Järfälla (SE)

( * ) Notice: Subject to any disclaimer, the term of this patent is extended or adjusted under 35 U.S.C. 154(b) by 641 days.

(21) Appl. No.: 12/562,442

(22) Filed: Dec. 2, 2009

(65) Prior Publication Data

US 2010/0066671 A1 Mar. 18, 2010

Related U.S. Application Data

(63) Continuation of application No. PCT/SE2009/050270, filed on Mar. 17, 2009.

(30) Foreign Application Priority Data

Mar. 28, 2008 (SE) .................................. 0800694-2

(51) Int. Cl.
G06F 3/033 (2006.01)
G09G 5/08 (2006.01)

(52) U.S. Cl. ....................................................... 345/157

(58) Field of Classification Search .......... 345/156–178; 178/18.01–19.07
See application file for complete search history.

(56) References Cited

U.S. PATENT DOCUMENTS

2004/0169634 A1* 9/2004 Stromberg .................... 345/156
2006/0279540 A1* 12/2006 Stromberg .................... 345/157

FOREIGN PATENT DOCUMENTS

| CN | 1813235 | 8/2006 |
|---|---|---|
| EP | 0130649 | 1/1985 |
| JP | 2001-184159 | 7/2001 |
| WO | 2005-000394 | 1/2005 |
| WO | 2005/003949 | 1/2005 |

OTHER PUBLICATIONS

International Search Report for corresponding application No. PCT/SE2009/050270 completed Jun. 15, 2009.

* cited by examiner

Primary Examiner — Michael Pervan
(74) Attorney, Agent, or Firm — Renner, Otto, Boisselle & Sklar, LLP

(57) ABSTRACT

Loop member 10 for pointing devices for computers, consisting of a number of axially extending thin wires 11, 12, 13, 15, 16, twined in each other in such a way that the wires 11, 12, 13, 15, 16 work as links that can rotate a small angle in relation to each other. The wires 11, 12, 13, 15, 16 together build up a tangentially bendable cylinder, the cross-section of which is stretched into an elongate shape via two supports. Between the supports, there is a thin plate on which the upper part of the cylinder rests. The upper surface of the cylinder can be reached by a user through an opening in an apparatus box and be moved in a two-dimensional way, the move being detected and giving rise to the corresponding move of a pointer or the like on a screen. Suitable embodiment for said supports and peripheral mechanics is also shown.

11 Claims, 4 Drawing Sheets

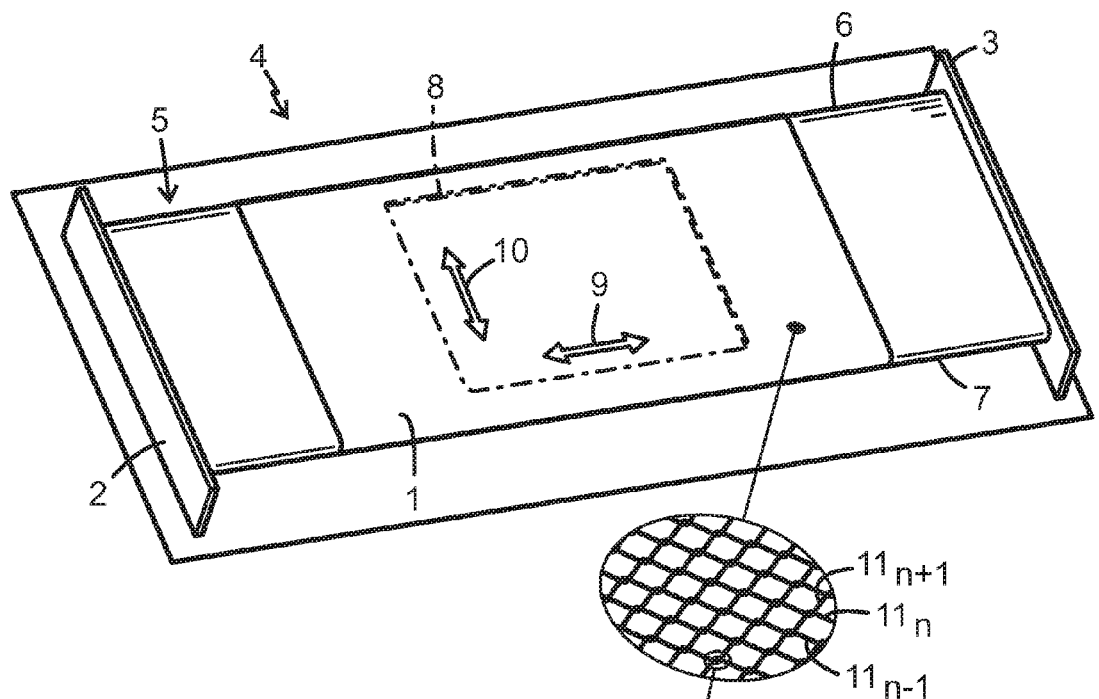
FIG. 1
FIG. 1A
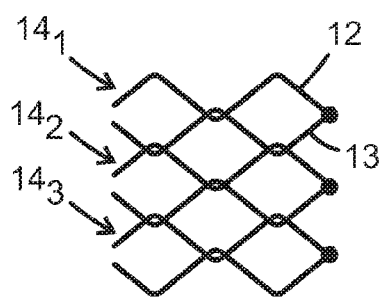
FIG. 2
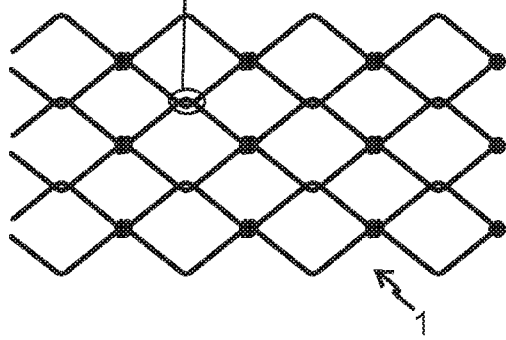
FIG. 3

LOOP MEMBER FOR POINTING DEVICES FOR COMPUTERS, CONSISTING OF WIRES LINKED TO EACH OTHER AS WELL AS POINTING DEVICE COMPRISING SUCH A LOOP MEMBER

This application is a continuation of International Application No. PCT/SE2009/050270 filed on Mar. 17, 2009, which claims priority of Swedish Patent Application No. 0800694-1 filed on Mar. 28, 2008.

The present invention relates to a loop member for the control of a pointer, image or the like on a screen, display or the like, in at least one direction, in the form of a tangentially bendable cylinder that is arranged to, by a user, be possible to be rotated around support members arranged parallel to the longitudinal axis of the loop member, which support members stretch the cross-section of the loop member into an elongate shape, and to be translated in the axial direction thereof between end positions, wherein the motion of the loop can be detected using means that get the pointer to move on the screen.

In the PCT application PCT/SE01/01620 by the author of the present patent application, a pointing device is disclosed in the form of a loop device to control a pointer or the like on a screen. The loop device consists in principle of a cylinder (loop) consisting of a bendable thin material, which is arranged to be rotated over two rods by the user, and to be translated parallel to the longitudinal axes of the rods. Motion of the loop is detected using electronics connected to a computer, wherein a pointer, image, or the like is brought to move in a corresponding way on a screen.

Although apparatuses according to this technique now are in production and work very well, the field of application has hitherto been limited to be placed in front of an existing keyboard for desktop computers. Usage in connection with laptop computers has hitherto not been optimal since the height of the loop device has not been possible to be made sufficiently small. The demand for usage in connection with laptop computers, either for installation or as an accessory device to be placed under the spacebar of the existing the wrist support is, however, very great, since the dominating pointing device for laptop computers, the touchpad, is negatively experienced by many users. In the above mentioned patent application, a number of disadvantages of the touchpad are accounted for.

If the height of the loop device could be made sufficiently small, also usage in connection with remote controls for TV, multimedia, volume controls or other apparatuses would be suitable.

The PCT application PCT/SE03/01160 discloses an optimized loop, consisting of a highly bendable supporting material, in practice thin fabric, provided with axially stiffening strips on the inside of the loop and friction material outside the loop on the strips. The friction material facilitates for the user to move the loop by the finger. The stiffening strips provides an axial stiffness of the loop that is required because the motion of the loop in the axial direction thereof of necessity has to be limited by end stops, and without the axial stiffness the loop could be deformed mechanically when the end of the loop has reached an end stop and the user presses the loop in the same direction. Zones between the strips are present where the supporting material is free to be bent.

Thus, an apparatus according to the two above documents has a loop that is rotatable over two rotatable rods, and displaceable parallel to the longitudinal axes of the rods. The rods follow the envelope motion of the loop. The upperside of the loop rests on a fixed plane support, and thereby has a plane upper surface. Above this plane surface, there is an opening in an apparatus box that defines a pointing surface, where the user can move the loop for cursor motion in two dimensions, vertically, horizontally or combinations thereof on the screen.

Unfortunately, such a loop has not been realizable with a total height less than approx. 10 mm, among other things, depending on too great a memory effect depending on relaxation of the selected very flexible supporting material used. The relaxation increases with decreasing bending radius of the supporting material because of increasing internal stresses. The relaxation disturbs the function in the following way: suppose the loop device has been left unused for a time. Then, the relaxation results in the supporting material of the loop having got a permanent bending around the rods. If the user then moves the loop a small distance in the pointing surface so that the rods rotate a small angle and after that leaves the hold of the loop, the rods and thereby the pointing surface of the loop will be moved back to the original position, i.e., the position having the lowest internal stresses. This is not acceptable, since the cursor on the screen, after having been moved a small distance, returns to the original position.

There is an additional factor that limits the possibility of decreasing the height of the loop device. When the loop rotates over the rods, the user experiences an "irregular running" that is inconvenient, because of the stiffening strips giving an uneven rolling on/off, just when they enter onto or leave a rod. This effect increases with increasing distance (pitch) between the strips. In practice, it has not been possible to decrease the pitch to significantly less than 2.5 mm, because of the flexing areas of the loop between the strips then becoming too short with too great a memory effect as a consequence. Given that the pitch is 2.5 mm, the diameter of the rods cannot be decreased to a value significantly less than approx. 5 mm since irregular running then would arise at too high an extent.

Yet a factor that limits the possibility of constructing a low loop device is the inherent thickness of the loop, which in practice hardly can be made smaller than approx. 0.80 mm, given the thickness of the stiffening strips, the fabric and the friction material. The thickness of the upper and lower part of the loop is added when the total height of the device is to be calculated; accordingly, here we already have 2×0.8=1.6 mm of thickness that is added to the diameter of the rods. The lower part of the loop hangs down some mm from the locations where they leave the rods, and here 2-3 mm of thickness is added.

According to the above, it is evident that a total height as small as 2.5 mm never can be attained. 2.5 mm corresponds to approximately the thickness of a general touchpad.

An object of the present invention is to demonstrate a considerably thinner axially stiff loop without memory effect, at the same time as the correspondence to the pitch described above is of the size of 1 mm, which allows that the loop without inconvenient irregular running can rotate over the rotatable rods in spite of these having such a small diameter as about 2 mm.

In simple embodiments, a loop made according to the present invention lacks friction material on the outside. It may be perceived as negative if the users finger slides against the loop instead of moving it, and this may occur if the total friction (the resistance to motion of the loop under the users finger) is too high. Also, if the total mass that is to be moved is too great, the user's finger may slide against the loop, since the mass makes fast moves more difficult.

Therefore, an object is to minimize both friction and weight, both of the loop itself but also of the mechanics (peripheral mechanics) used in order to support the loop and keep it expanded and that follows the motion of the loop.

An additional object is to demonstrate a loop that has a simple structure.

Still another object is to demonstrate peripheral mechanics that also is simple and thereby easy to manufacture.

The above objects is attained in the present invention by the fact that the loop member consists of a number of wires arranged along the axis of the loop member and at least in some locations twined at least one half a turn in, but not attached to, an adjacent one.

Different embodiments of the invention are described in the dependent claims in association with the main claim.

In one embodiment of the invention, the wires are twined (hooked) in each other in the same way as the wires of chain link fences.

In another embodiment of the invention, at least some of the wires at or near the ends thereof are attached together in pairs.

In another embodiment of the invention, at least some of the wires of the pairs of wires are attached together in at least one additional point.

In another embodiment, the attaching together is made by intertwining.

In another embodiment, at least some of the pairs of wires have portions intertwined with oppositely directed pitch.

In another embodiment, the loop member has, on the envelope surface thereof, friction material arranged at the locations where the wires are attached together.

In another embodiment, a pointing device comprises a loop member according to the invention wherein said support members are parallelly arranged, rotatably and translatably mounted, and situated at the edges of a plate arranged between the support members.

In another additional embodiment, each one of said support members consists of a stiff wire on which a number of round plates are arranged.

In another additional embodiment, the support members comprise magnetic material and are attracted away from the respective edge thereof of the plate by means of a respective magnet device by a force each, in such a way that one of the support members abuts against an edge of the plate by the force resulting from the magnet devices.

In another additional embodiment, said support members are fixedly arranged in relation to the loop member.

The invention will be described below in more detail with reference to the accompanying figures, which illustrate loop members for the control of pointers in accordance with embodiments of the invention without limiting the invention only to what is illustrated in the drawing figures.

FIG. 1 shows an explanatory sketch of a loop member according to the present invention;

FIG. 1A shows a bearing point.

FIG. 2 shows wires attached together in the ends;

FIG. 3 shows wires attached together in several locations;

Figure 4:
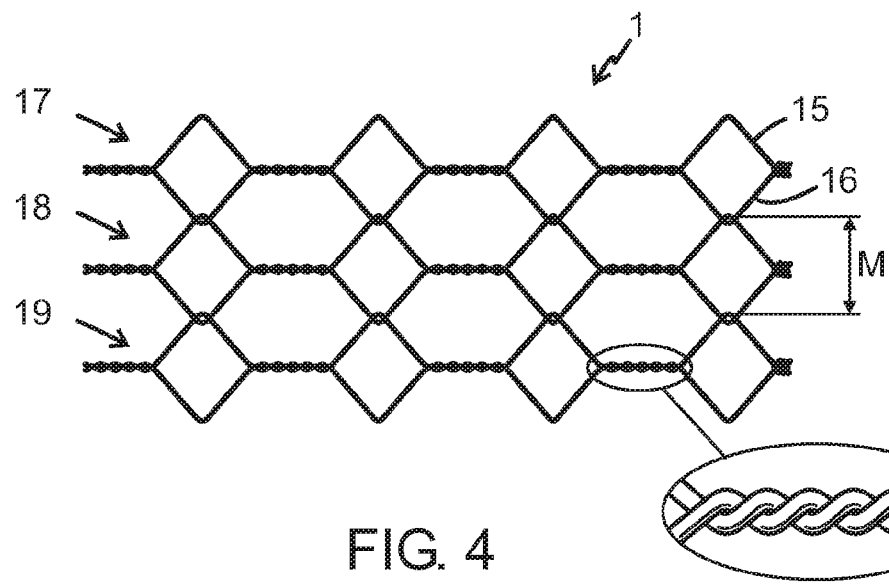
FIG. 4 shows wires attached together by means of twining.

FIG. 1 shows a loop 1 that is tangentially flexible but axially functionally stiff. It is suspended on a plate 5 attached inside an apparatus box 4 and provided with two rounded sides, 6 and 7, which stretch the cross-section of the loop 1 into an elongate shape. The apparatus box 4 has an open area 8, in which the loop 1 can be reached by a user and be displaced axially (in the direction of the arrow 9) between the end stops 2 and 3 attached to the apparatus box 4, but also be rotated in the direction of the arrow 10 over the sides 6 and 7. The axial motion is detected and gives rise to electrical signals that are fed to, e.g., a computer, which converts the signals to motion of a cursor, image or the like in a first direction, suitably lateral, on a screen. Also rotation of the loop over the sides 6 and 7 of the plate 5 is detected and gives rise to motion in a second direction on the screen, suitably vertical. The detection in question may be effected using an optical mouse sensor, such as Avago ADNS 5020 or the like. This type of detection can nowadays be considered conventional.

The loop 1 consists of a number of axially running thin wires $11_n$, made of a stiff material, such as steel. Each wire $11_n$ is bent in a zigzag pattern so that each "zig" hooks in the closest lying wire $11_{(n+1)}$ on one of the sides, and each "zag" hooks in the closest lying wire $11_{(n-1)}$ on the other side. The same technique to braid or twine wires in relation to each other is found in so-called chain link fences. Expressed in another way, the wires are, at each location they meet and thereby in contact with each other, twined ½ turn in each other. Each such location is henceforth called bearing point, shown in FIG. 1A.

Suppose we have 100 pcs. of wires, $11_1$-$11_{100}$. In a number of bearing points, wire $11_1$ is twined ½ turn in the "neighbours" thereof, the wires $11_{100}$ and $11_2$. In a number of bearing points, wire $11_2$ is twined ½ turn in the neighbours $11_1$ and $11_3$ thereof, etc. It should be noted that the individual wires are not fixedly connected with each other at the bearing points thereof even if they contact each other there; therefore they can rotate a small angle in relation to each other. Thereby, all wires together form a loop 1 that is tangentially bendable.

In comparison with a loop made according to the PCT application PCT/SE03/01160, there are the following advantages:

1. Since the wires are not attached to each other, there is no memory in the loop.

2. The inherent thickness of the loop is very small, approx. 0.25 mm if the individual wires of the loop have a diameter of 0.10 mm 3. The pitch between the individual wires may advantageously be made as small as 1 mm, which allows sufficiently even winding on and off over the supports 6 and 7 in spite of the radius of the supports that stretch the loop being as small as 1 mm.

The lateral motion of the loop is limited, and therefore the ends occasionally will contact the end stops 2 and 3. A disadvantage of this embodiment is that the individual wires 11 then may be "unravelled" in the ends. Therefore, an embodiment is shown in FIG. 2 where this problem is eliminated. Here, the wires are attached together in pairs in the ends. A pair of wires $14_1$, which consists of the wires 12 and 13, is in a number of bearing points twined ½ turn to a pair of wires $14_2$, which is twined to a pair of wires $14_3$, etc. A pair of wires $14_1$ may, via the bearing points thereof, turn an angle in relation to a pair of wires $14_2$, which in turn, via the bearing points thereof, may turn an angle in relation to a pair of wires $14_3$, etc. Since each wire end is attached to another wire end, the wire ends can never be unravelled.

A variant of this embodiment is shown in FIG. 3, wherein the pairs of wires are attached together not only in the ends but in more points.

A disadvantage of the embodiments shown in connection with FIGS. 2 and 3 is that it may be difficult to attach together the wires of each pair of wires sufficiently strong. The wires are thin, the size of 0.10 mm; welding may therefore be unreliable since the wire may lose strength. Soldering is conceivable, but it may be difficult to find a suitable solder for the wires, which suitably are made of stainless hard steel. The soldering temperature must not be so high that the wires lose their hardness.

Therefore, a preferred embodiment example is shown in connection with FIG. 4, where the above difficulties are solved. Here a pair of wires 17 is shown, where the wires 15 and 16 are intertwined 2.5 turns. This eliminates soldering or welding at the same time as the wires become very reliably attached together. The number of turns that the wires are intertwined may very well be selected to be significantly greater than 2.5. In four bearing points, the pair of wires 17 is twined ½ turn to the pair of wires 18, which in four bearing points is twined ½ turn to the pair of wires 19, etc.

The diameter of the wires were 0.10 mm in a working prototype, the mesh size M was 1 mm, and the number of wires were 30.

Figure 5:
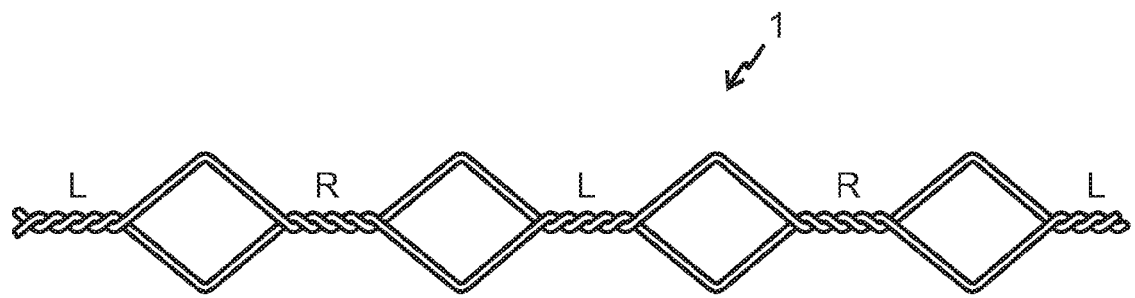
FIG. 5 shows twining in different directions.

Each intertwined pair of wires are held more firmly together if the intertwining runs in right hand turns in certain locations and left hand turns in other, which is shown in FIG. 5 where only one pair of wires is shown. The wires are intertwined in right hand turns in the locations marked with R and in left hand turns at marking L.

Figure 6:
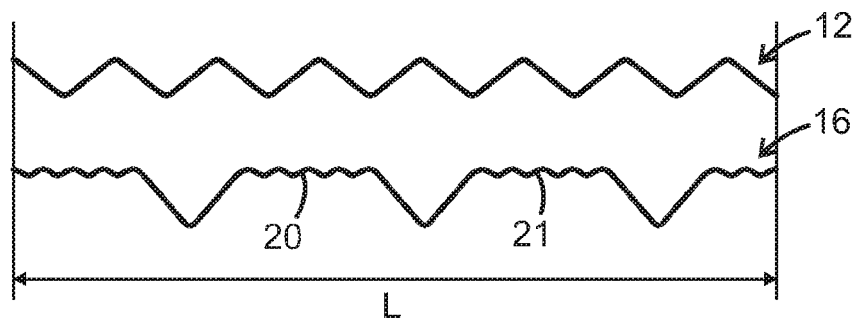
FIG. 6 illustrates straightness of intertwined wires.

Above, it was mentioned that the loop device should have as low weight as possible, so that it easily follows the motion of the users finger. This embodiment allows a lighter loop than if the pairs of wires are joined via soldering. If soldering is made, the weight of the solder in the soldering points is added to the loop device. Here, this problem is eliminated since solders are lacking. There is an additional a weight-reducing factor, which is illustrated in connection with FIG. 6. If the weight of the loose wire 16 taken from the embodiment in FIG. 4 is compared with the weight of the loose wire 12 taken from the embodiment example according to FIG. 2, it is seen that the weight of the wire 16 is lower than of the wire 12, even if the total length L, wire diameter and wire material of the loop are the same. This depends on the fact that the wire 16, where it is twined, has portions 20 and 21 that extend more straight on axially seen in comparison with the wire 12. Thereby, the wire 16 becomes shorter with lower weight as a consequence. Also the axial stiffness increases, which is an advantage.

Figure 7:
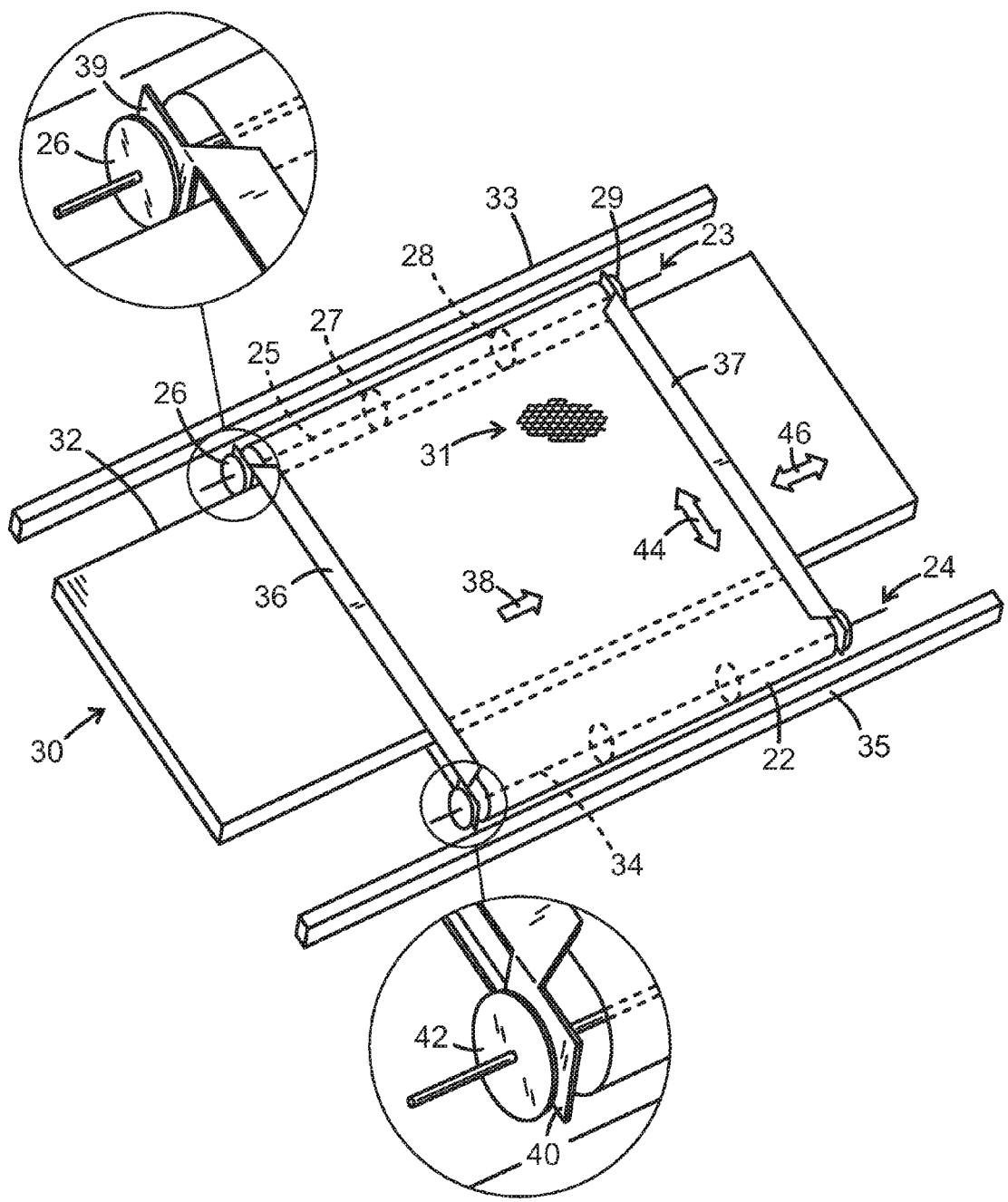
FIG. 7 shows suitable peripheral mechanics for a loop member according to the present invention.

In FIG. 7, preferred supporting mechanics for a loop 22 is shown. The loop 22 is stretched by the two rods 23 and 24. One of the rods 23 is constructed from a straight metal wire 25, made of a magnetic material, such as steel. The wire 25 is provided with small plastic plates, in this case four; 26, 27, 28 and 29. The other rod 24 is advantageously, but does not have to be, identical to the rod 23. Between the rods 23 and 24, there is a plate 30 that is attached to an apparatus hood (not shown) and on which the upper part 31 of the loop 22 rests. The rod 23 contacts the edge 32 of the plate 30. The wire 25 of the first rod 23 is attracted by means of a first magnet 33 by the force F, while the wire 34 of the other rod 24 is attracted by means of a second magnet 35 by a somewhat greater force F2. Thereby, the rod 23 is pressed against the edge 32 by a force that is equal to F2−F1 and that should be selected to be small. This minimizes the friction of the rod 23 against the edge 32, at the same time as the loop 22 is stretched by a greater force, namely F2. Thereby, the total friction becomes so small that the loop 22 is movable by such a small force that the friction between the user's finger and the upper part 31 of the loop always is enough to move the loop.

The rods 23 and 24 should be held fixed laterally in relation to the loop 22, which is managed by the side stops 36 and 37. The side stop 36 consists of a thin steel foil, which extends over the edge of the upperside 31 of the loop. At the sides of the supporting plate 30, the side support 36 has two turned-down tongues 39 and 40, which axially seen extend outside the end of the loop 22 but inside the outermost plates 26 and 42 of the rods 23 and 24.

The side stop 36 locks the rods 23 and 24 against motion in relation to the loop 22 in the direction indicated by the arrow 38. The other side stop 37 works similarly and locks the rods 23 and 24 in the opposite direction.

When the user moves the upperside 31 of the loop 22 in the direction of the two-way arrow 44, the loop 22 rotates around the rods 23 and 24, which also rotate. When the user moves the upperside 31 of the loop in the direction of the two-way arrow 46, the loop 22, together with the rods 23 and 24 as well as the side stops 36 and 37, are moved as a unit in the same direction. Thereby, the user experiences that the upper surface 31 of the loop 22 can be moved in a two-dimensional way.

Below, examples of some modifications within the claims are indicated:

The rods may be rotatably mounted on a carriage, which in turn is translatable in relation to an apparatus base frame. However, this does not minimize the weight that has to be moved laterally and increases the complexity.

Since the loop can be moved so easily, and the movable mass is so small, friction material is scarcely needed on the outside of a loop according to the present invention. However, friction material may be added if desired, suitably in the locations that are marked by L and R in FIG. 5, for even better grip.

Figure 8:
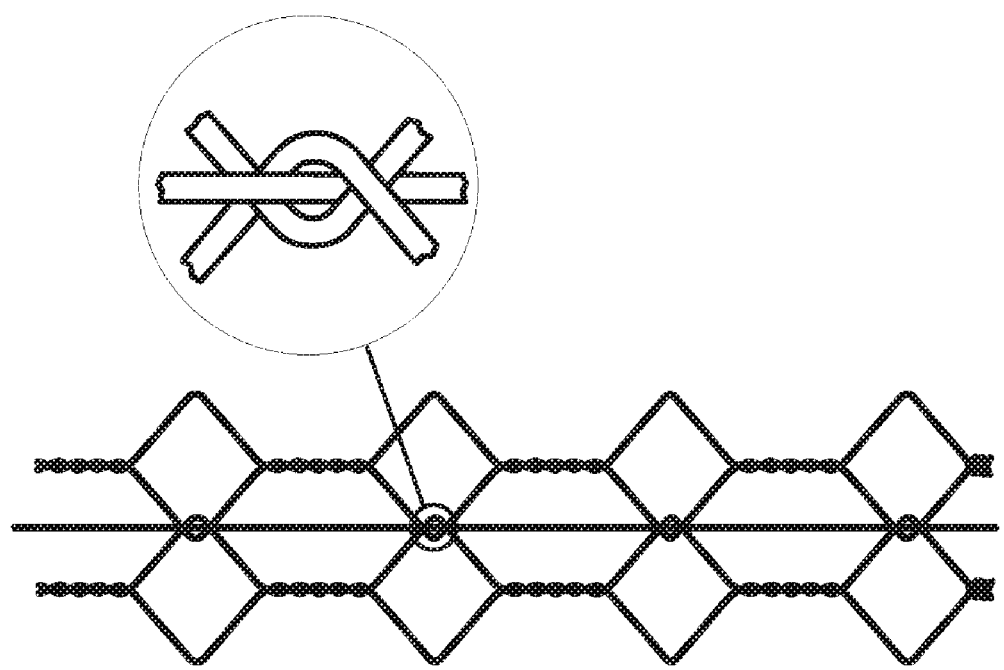
FIG. 8 shows an embodiment of the invention having bearing points including an extra wire.

Two adjacent wires may have a wire running between themselves at the bearing points thereof according to FIG. 8; the intermediate wire does not change the fact that the other wires are twined in each other. The advantage is that the wires at the bearing points thereof can turn a somewhat greater angle in relation to each other.

Figure 9:
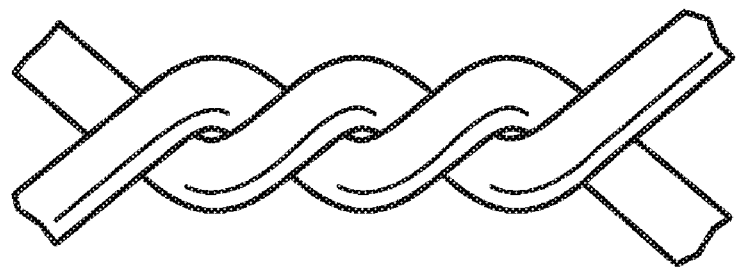
FIG. 9 shows in an enlargement an attaching-together area of twining.

The wires or the pairs of wires may be intertwined more than 0.5 turn where they meet at the bearing point. In FIG. 9, a bearing point is shown where the wires are loosely twined 1.5 turns. The disadvantage may be that the wires cannot turn a sufficient angle in relation to each other.

This application hereby incorporates by reference International Application No. PCT/SE2009/050270 filed Mar. 17, 2009 and Swedish Patent Application No. 0800694-2 filed Mar. 28, 2008.

The invention claimed is:

1. A loop member for the control of a pointer, image or the like on a screen, display or the like, in the form of a tangentially bendable cylinder that is arranged to, by a user, be possible to be rotated around support members arranged parallel to the longitudinal axis of the loop member, which support members stretch the cross-section of the loop member into an elongate shape, and to be translated in the axial direction thereof between end positions, wherein the motion of the loop can be detected using means that get the pointer to move on the screen, the loop member comprising a number of wires made of a stiff material and arranged along the axis of the loop member, with at least some of the wires being at least in some locations twined at least one half a turn in, but not attached to, an adjacent one.

2. The loop member according to claim 1, in which the wires are twined/hooked into each other in the same way as the wires of chain link fences.

3. The loop member according to claim 1, in which at least some of the wires at or near the ends thereof are attached together in pairs.

4. The loop member according to claim 3, in which at least some of the wires of the pairs of wires in at least one additional point are attached together.

5. The loop member according to claim 4, in which the loop member, on the envelope surface thereof, has the most of the friction material arranged at the locations where the wires are attached together.

6. The loop member according to claim 3, in which the attaching together is made by intertwining.

7. A pointing device comprising a loop member according to claim 1, in which said support members are parallelly arranged, rotatably and translatably mounted, and situated at the edges of a plate arranged between the support members.

8. A pointing device according to claim 7, in which each one of said support members consists of a stiff wire on which a number of round plates are arranged.

9. A pointing device according to claim 7, wherein the support members comprise magnetic material and are attracted away from the respective edge thereof of the plate by means of a respective magnet device by a force each, in such a way that one of the support members abuts against an edge of the plate by the force resulting from the magnet devices.

10. A pointing device, comprising a loop member according to claim 1, in which said support members are fixedly arranged in relation to the loop member.

11. A loop member for the control of a pointer, image or the like on a screen, display or the like, in the form of a tangentially bendable cylinder that is arranged to, by a user, be possible to be rotated around support members arranged parallel to the longitudinal axis of the loop member, which support members stretch the cross-section of the loop member into an elongate shape, and to be translated in the axial direction thereof between end positions, wherein the motion of the loop can be detected using means that get the pointer to move on the screen, the loop member comprising a number of wires arranged along the axis of the loop member, with at least some of the wires being at least in some locations twined at least one half a turn in, but not attached to, an adjacent one, and wherein at least some of the wires at or near the ends thereof are attached together in pairs, the attaching together is made by intertwining, and at least some of the pairs of wires has portions intertwined with oppositely directed pitch.

\* \* \* \* \*